US 6,639,717 B2

(12) United States Patent
Sugiyama

(10) Patent No.: US 6,639,717 B2
(45) Date of Patent: Oct. 28, 2003

(54) MULTI-FREQUENCY TELESCOPE APPARATUS FOR CELESTIAL OBSERVATIONS USING REFLECTING TELESCOPE

(75) Inventor: Ryuuichi Sugiyama, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 268 days.

(21) Appl. No.: 09/922,730

(22) Filed: Aug. 7, 2001

(65) Prior Publication Data
US 2002/0105724 A1 Aug. 8, 2002

(30) Foreign Application Priority Data
Feb. 6, 2001 (JP) ........................................ 2001-030139

(51) Int. Cl.7 ............................................... G02B 23/00
(52) U.S. Cl. ...................... 359/399; 359/359; 359/360; 359/361
(58) Field of Search ................... 359/399, 359, 359/360, 361, 366, 859, 883, 884, 631, 633, 634, 861, 851, 853, 584, 586, 588, 589

(56) References Cited

U.S. PATENT DOCUMENTS

| 4,639,069 A | * | 1/1987 | Yatabe et al. ................ 359/360 |
| 5,552,927 A | * | 9/1996 | Wheatly et al. ............. 359/359 |
| 5,661,610 A | * | 8/1997 | Pasternak ................... 359/859 |
| 5,847,879 A | * | 12/1998 | Cook .......................... 359/631 |
| 5,907,442 A | * | 5/1999 | Matsuda ..................... 359/858 |
| 5,930,055 A | * | 7/1999 | Eisenberg ................... 359/728 |
| 6,038,068 A | * | 3/2000 | Takeshi et al. .............. 359/399 |
| 6,395,398 B1 | * | 5/2002 | Nakashima et al. ......... 428/432 |
| 6,404,399 B1 | * | 6/2002 | Morita ........................ 343/761 |
| 6,441,740 B1 | * | 8/2002 | Brady et al. .............. 340/572.7 |
| 6,504,602 B1 | * | 1/2003 | Hinderling .................. 356/5.1 |

FOREIGN PATENT DOCUMENTS

| JP | 53-29745 | 3/1978 |
| JP | 5-19179 | 1/1993 |
| JP | 6-42898 | 2/1994 |

* cited by examiner

Primary Examiner—Mohammad Sikder
(74) Attorney, Agent, or Firm—Oblon, Spivak, McClelland, Maier & Neustadt, P.C.

(57) ABSTRACT

A telescope apparatus for celestial observations by a reflecting telescope which is provided with: a first reflecting mirror 3 having its surface 3a coated over the entire area thereof with a grid-like metallic film 10 that reflects radio waves 1 but permits the passage therethrough of infrared and visible rays 2 and having its back 3b coated over the entire area thereof with a full-face metallic film that reflects both of the radio waves 1 and the infrared and visible rays 2; and a second reflecting mirror 4 having its surface 4a coated over the entire area thereof with the grid-like metallic film 10 that reflects the radio waves 1 but permits the passage therethrough of the infrared and visible rays 2 and having its back 4b coated over the entire area thereof with the full-face metallic film 11 that reflects both of the radio waves 1 and the infrared and visible rays.

20 Claims, 9 Drawing Sheets

MULTI-FREQUENCY TELESCOPE APPARATUS FOR CELESTIAL OBSERVATIONS USING REFLECTING TELESCOPE

BACKGROUND OF THE INVENTION

1. Field of the Invention

The present invention relates to a multi-frequency telescope apparatus for celestial observations using a reflecting telescope for observing celestial objects which emit radio waves, infrared rays and visible light, such as fixed stars, planets, galaxies, star clusters and gases.

2. Description of the Prior Art

FIG. 8 is a cross-sectional view of a conventional reflecting optical telescope apparatus of a Cassegrain optical system disclosed, for example, in Japanese Patent Application Laid-Open Gazette No. 05-19179. FIG. 9 is a sectional view of the optical system of the conventional telescope apparatus depicted in FIG. 8. Reference numeral 1 denotes radio waves from celestial objects; 2 denotes infrared and visible rays from the celestial objects; 3 denotes a main reflecting mirror coated over the entire area of its curved glass surface 3a with a thin metallic film 11 as of aluminum (Al); and 4 denotes a sub reflecting mirror coated over the entire area of its curved glass surface 4a with a thin metallic film 11 as of aluminum, for bringing the reflected light from the main reflecting mirror to a Cassegrain focus 6 where a light receiving element or an optical system 9 for an observation apparatus is placed.

The above is a typical example of an infrared, visible-light telescope. On the other hand, a conventional radiotelescope has its main and sub reflecting mirrors formed of aluminum, CFRP or similar conductive material instead of glass and employs a primary radiator for a receiver or beam transmission system in place of the light receiving element or optical system 9 for observation apparatus.

The operation of the prior art example of FIG. 8 will be described below.

The radio waves or infrared and visible rays 2 from celestial objects are reflected first by the main reflecting mirror 3, and reflected again by the sub reflecting mirror 4 placed before the focus of the main reflecting mirror 3 to form an image on the Cassegrain focus 6. And, celestial observations are made by the light receiving element or optical system 9 of the infrared, visible-light telescope, or the primary radiator or beam transmission system 5 of the radiotelescope disposed at the position of the Cassegrain focus 6.

As described above, the celestial observations are carried out receiving radio waves or infrared and visible rays from the celestial objects; the radio waves are emitted only from low-temperature portions of celestial objects, whereas the infrared and visible rays emanate only from high-temperature portions. With the conventional telescope apparatus of such a construction as referred to above, the celestial objects of locally different temperatures cannot be observed in their entirety at one time, and hence images obtained with dedicated telescopes corresponding to respective frequencies need to be pieced together to get the whole picture of what are observed. Moreover, observation frequencies of radiotelescopes have recently approached approximately 1/300 of frequencies of the visible and infrared rays, and the precision required of the radiotelescopes has sharply been improved accordingly; hence, it is uneconomical to use telescopes corresponding to the respective frequencies.

SUMMARY OF THE INVENTION

It is therefore an object of the present invention to provide a multi-frequency telescope apparatus for astronomical observations that uses only one reflecting telescope capable of simultaneously receiving radio waves, infrared and invisible rays.

According to an aspect of the present invention, there is provided a multi-frequency telescope apparatus for celestial observations using a reflecting telescope which includes a first reflecting mirror coated over the entire area of its surface with a grid-like metallic film that reflects radio waves but permits the passage therethrough of infrared and invisible rays and coated over the entire area of its back with a fall-face metallic film that reflects the radio waves and the infrared and visible rays.

Preferably, according to another aspect of the present invention, the multi-frequency telescope apparatus further includes a second reflecting mirror coated over the entire area of its surface with a grid-like metallic film that reflects radio waves but permits the passage therethrough of infrared and invisible rays and coated over the entire area of its back with a full-face metallic film that reflects the radio waves and the infrared and visible rays.

Preferably, according to another aspect of the present invention, the second reflecting mirror is coated over the entire area of its surface with a full-face metallic film that reflects the radio waves and the infrared and visible rays.

Preferably, according to another aspect of the present invention, the multi-frequency telescope apparatus has a Cassegrain optical system in which the first reflecting mirror is a concave mirror and the second reflecting mirror is a convex mirror.

Preferably, according to another aspect of the present invention, the multi-frequency telescope apparatus has a Cassegrain optical system in which the first reflecting mirror is a convex mirror and the second reflecting mirror is a concave mirror.

Preferably, according to another aspect of the present invention, the multi-frequency telescope apparatus has a Gregorian optical system in which the first and second reflecting mirrors are both concave mirrors.

Preferably, according to another aspect of the present invention, the multi-frequency telescope apparatus has a prime focus optical system using only the first reflecting mirror.

Preferably, according to another aspect of the present invention, the multi-frequency telescope apparatus further includes a plane mirror placed upstream or short of the focal point of the radio waves on the optical axis of the first reflecting mirror, and a plane mirror placed upstream or short of the focal point of the infrared and visible rays on the optical axis of the first reflecting mirror.

Preferably, according to another aspect of the present invention, the multi-frequency telescope apparatus further includes observation equipment, such as a receiver and a camera, disposed at the focal points of the radio waves and the infrared and visible rays displaced from the optical axis of the main reflecting mirror.

Preferably, according to still another aspect of the present invention, the multi-frequency telescope apparatus is not limited specifically to the radio waves and the infrared and visible rays and is capable of simultaneous observations of two incident waves of different frequencies.

DETAILED DESCRIPTION OF THE PREFERRED EMBODIMENTS

Embodiment 1

Figure 1:
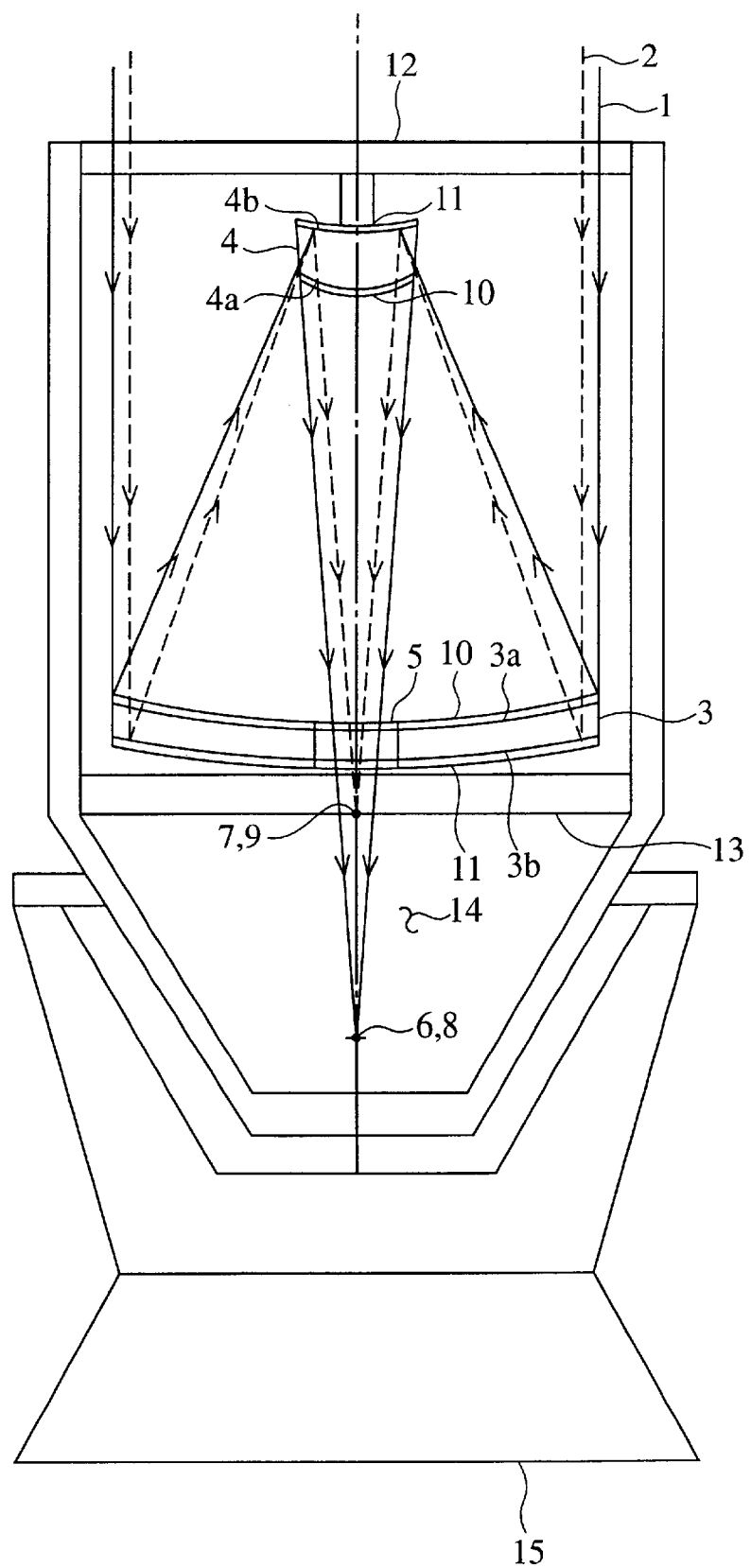
FIG. 1 is a sectional side view of a multi-frequency telescope apparatus according to a first embodiment of the present invention.
Figure 2:
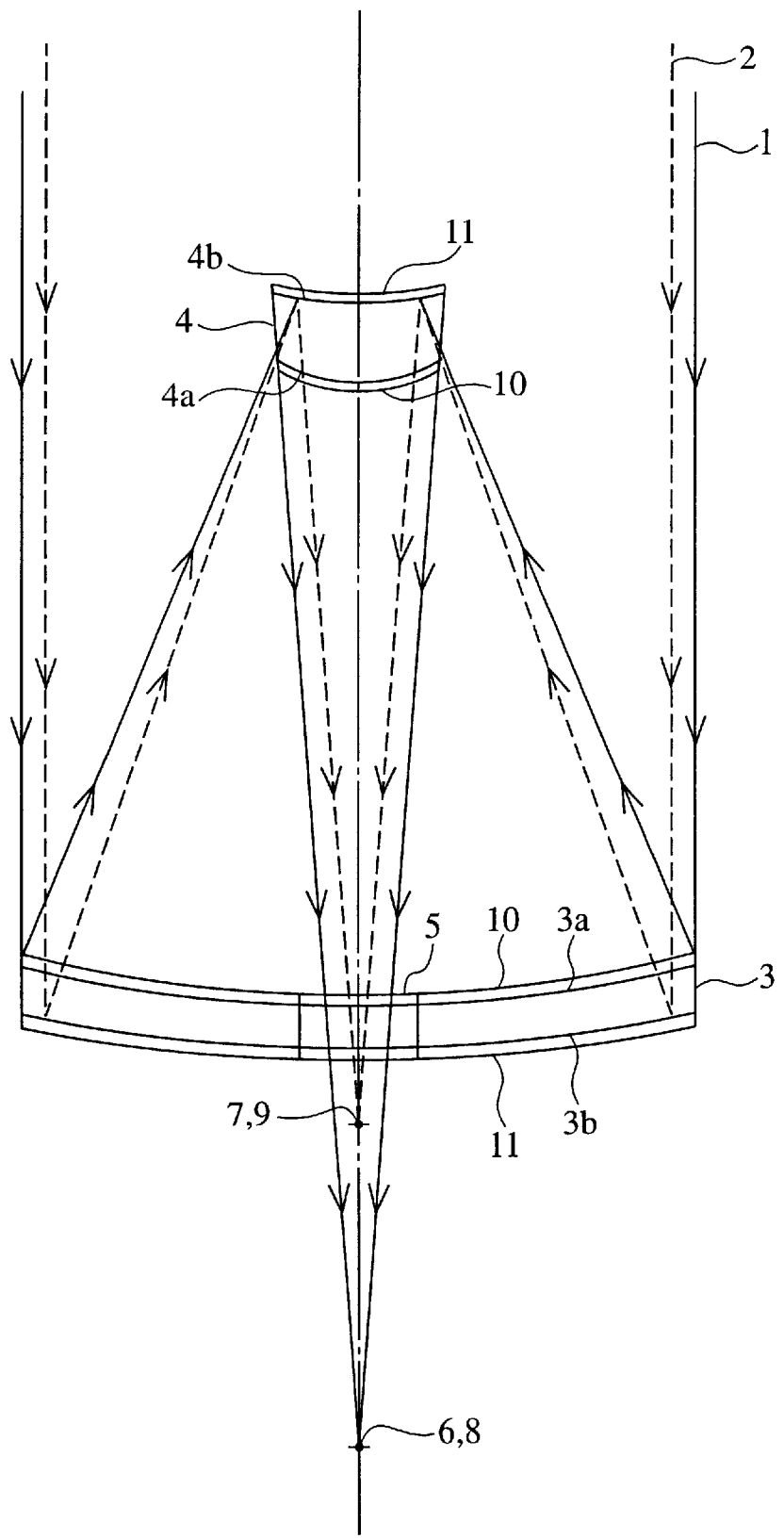
FIG. 2 is a sectional view of the optical system of the telescope apparatus according to the first embodiment of the invention.

FIG. 1 schematically illustrates the general configuration of a multi-frequency telescope apparatus for astronomical observations according to a first embodiment (Embodiment 1) of the present invention. FIG. 2 shows the optical system of the FIG. 1 embodiment.

In FIG. 2, reference numeral 1 denotes radio waves from celestial objects; 2 denotes infrared and visible rays from the celestial objects; 3 denotes a main reflecting mirror made of glass; and 4 denotes a sub reflecting mirror also made of glass. The main and sub reflecting mirrors 3 and 4 have their surfaces 3a and 4a over the entire areas thereof coated with a grid-like metallic film 10 that reflects the radio waves 1 from the celestial objects but permit the passage therethrough of the infrared and visible rays 2, the backs 3b and 4b of the main and sub reflecting mirrors 3 and 4 each being coated over the entire area thereof with a full-face metallic film 11 that reflects the radio waves 1 and the infrared and visible rays.

Reference numeral 5 denotes a center opening of the main reflector 3; 6 denotes a focal point of the radio waves 1; 7 denotes a focal point of the infrared and visible rays 2; and 8 and 9 denote sensor units of the celestial observation apparatus placed at the focal points 6 and 7, respectively. The sensor unit 8 is a receiver horn for the radio waves 1 or a beam transmission system, whereas the sensor unit 9 is a light receiving element for the infrared and visible rays 2 or the optical system of the observation apparatus.

In Embodiment 1, the main reflecting mirror 3 is a first reflecting mirror formed by a concave mirror and the sub reflecting mirror 4 is a second mirror formed by a convex mirror. Accordingly, the optical system of the telescope apparatus according to Embodiment 1 is a Cassegrain optical system.

In this specification, the surfaces 3a and 4a of the main and sub reflecting mirrors 3 and 4 each refer to the side thereof on which the radio waves or infrared and visible rays incident to the reflecting mirror are thereby reflected, and the backs 3b and 4b of the main and sub reflecting mirrors 3 and 4 each refer to the side thereof opposite the above-mentioned side on which the radio waves or infrared and visible rays incident to the reflecting mirror are thereby reflected.

In FIG. 2, the radio waves 1 from the celestial objects are reflected by the grid-like metallic film 10 coated all over the surface 3a of the main reflector 3 and reflected again by the grid-like metallic film 10 over the surface 4a of the sub reflector 4, and the reflected waves pass through the opening 5 of the main reflecting mirror 3 and converges to the focal point 6 in the rear of the main reflecting mirror 3.

The infrared and visible rays 2 pass through the grid-like metallic film 10 coated all over the surface 3a of the main reflecting film 3 and are reflected by the full-face metallic film 11 over the back 3b of the main reflecting mirror 3. The thus reflected infrared and visible rays pass through the grid-like metallic film 10 of the sub reflecting mirror 4, then they are reflected again by the full-face metallic film 11 of the sub reflecting mirror 4 for convergence to the focal point 7 behind the main reflecting mirror 3.

The grid-like metallic films 10 are deposited over the entire areas of the surfaces 3a and 4a of the main and sub reflecting mirrors 3 and 4 as mentioned above. The width of each of metallic film segments and their spacing are so chosen as to optimize the reflectivity of the radio wave and the transmittance of the infrared and visible rays through utilization of the fact that the wavelength ratio between the radio waves and the infrared and visible rays to be observed is at least 3000 or more. That is, the grid-like metallic film 10 reflects the radio waves but allows the infrared and visible rays to pass therethrough. On the other hand, the full-face metallic film 11 is to reflect both the radio waves and the infrared and visible rays.

In this embodiment and second to sixth embodiments described below, the radio waves and the infrared and visible rays are separated through the use of the grid-like metallic film 10 that inhibits the passage therethrough of the radio waves but permits the passage therethrough of the infrared and visible rays through utilization of the fact that the wavelength ratio between the them is 3000 or more. The present invention is not limited specifically to the radio waves and the infrared and visible rays but is applicable to the separation of two incident waves of different wavelengths and consequently different frequencies.

The focal point 6 of the radio waves 1 and the position of the focal point 7 of the infrared and visible rays 2 can be determined independently and arbitrarily by suitably selecting the focal length between the surface 3a and the back 3b of the main reflecting mirror 3, the focal length between the surface 4a and the back 4b of the sub reflecting mirror 4, and the position of the sub reflecting mirror 4 relative to the main reflecting mirror 3.

As described above, according to this embodiment, since the focal point 6 of the radio waves 1 and the focal point 7 of the infrared and visible rays 2 are set at different positions, it is provide, around the focal points 6 and 7, spaces available for placement and simultaneous operation of the primary radiator for a receiver or beam transmission system 8, by which the radio waves 1 having converged to the focal point 6 are provided to the receiver, and the light receiving element of optical system 9 by which the infrared and visibly rays 2 having converged to the focal point 7 are provided to the observation apparatus. This enables celestial observations to be carried out simultaneously at the frequencies of the radio waves 1 and the infrared and visible rays 2.

Embodiment 2

Figure 3:
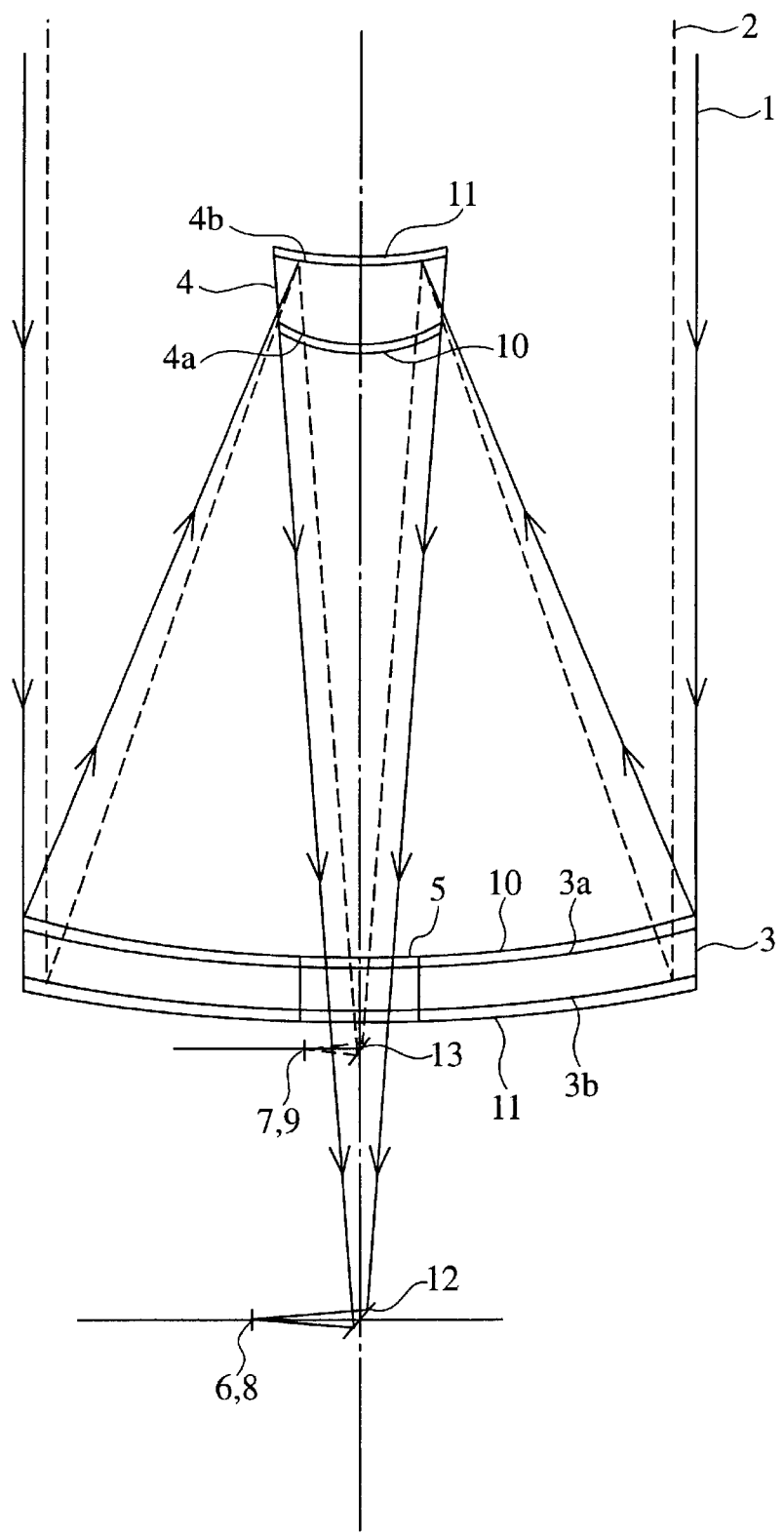
FIG. 3 is a sectional view of the optical system of a multi-frequency telescope apparatus according to a second embodiment of the invention.

FIG. 3 is a schematic showing of the optical system of a multi-frequency telescope apparatus for celestial observations using a reflecting telescope according to a second embodiment (Embodiment 2) of the present invention. In FIG. 3, the same parts as those in FIG. 2 are designated by similar reference numerals. Reference numeral 12 denotes a plane mirror disposed just short of the focal point 6; 13 denotes a plane mirror disposed just short of the focal point 7; 6' denotes a focal point newly provided by the placement of the plane mirror 12; and 7' denotes a focal point newly provided by the placement of the plane mirror 13.

In Embodiment 2, the main reflecting mirror 3 serves as a first reflecting mirror formed by a concave mirror, and the sub reflecting mirror 4 serves as a second reflecting mirror formed by a convex mirror. Accordingly, the optical system of the multi-frequency telescope apparatus of this embodiment is also a Cassegrain optical system.

While Embodiment 1 has been described to set the focal points 6 and 7 on the optical axis of the main reflecting mirror 3, no sufficient space is sometimes available for the primary radiator or beam transmission system 8 and the light receiving element or optical system 9 because of their bulkiness.

This embodiment is intended to solve this problem by shifting the focal points 6 and 7 from the optical axis of the main reflecting mirror 3. As depicted in FIG. 3, the plane mirrors 12 and 13 are disposed on the optical axis of the main reflecting mirror 3 just short of the focal points 6 and 7, by which the radio waves 1 and the infrared and visibly rays 2 are reflected for convergence to new focal points 6' and 7' displaced from the optical axis of the main reflecting mirror 3.

As described above, according to this embodiment, since the focal points 6' and 7' are displaced from the optical axis of the main reflecting mirror 3, it is possible to provide space wide enough to place both of the primary radiator or beam transmission system and the light receiving element 8 or optical system even when they are bulky 9. This structure also provides the same results as are obtainable with Embodiment 1.

This embodiment is a modified form of Embodiment 1, in which the plane mirrors 12 and 13 are so disposed as to newly set the focal points 6' and 7' apart from the optical axis of the main reflecting mirror 3. In the third to sixth embodiments described below, too, the focal points 6' and 7' can similarly be set apart from the optical axis of the main reflecting mirror by placing the plane mirrors 12 and 13 at such positions as mentioned above.

Embodiment 3

Figure 4:
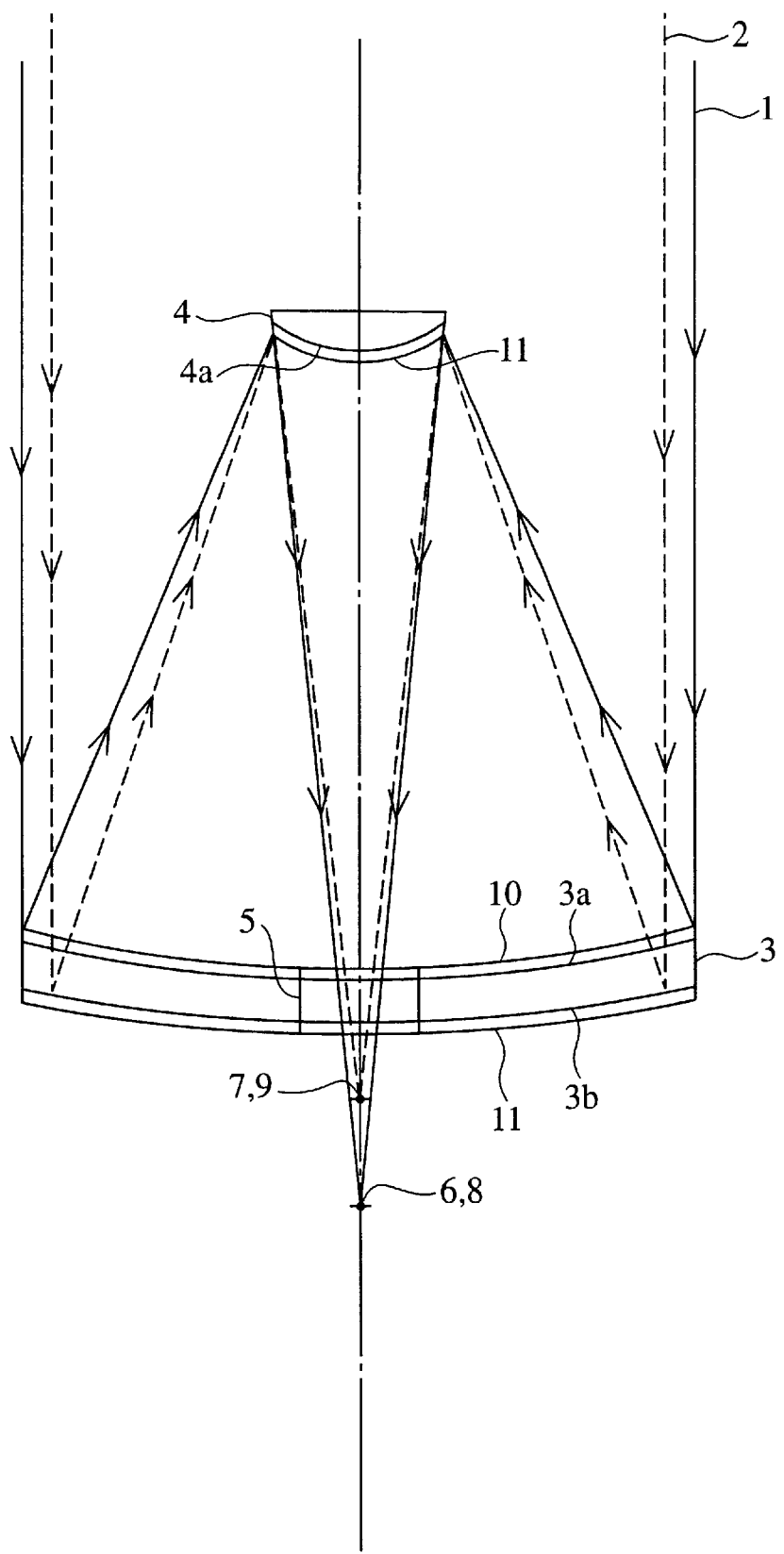
FIG. 4 is a sectional view of the optical system of a multi-frequency telescope apparatus according to a third embodiment of the invention.

FIG. 4 is a schematic showing of the optical system of a multi-frequency telescope apparatus for celestial observations using a reflecting telescope according to a third embodiment (Embodiment 3) of the present invention. In FIG. 4, the same parts as those in FIG. 2 are designated by similar reference numerals, and hence their description will not be repeated. In this embodiment the sub reflecting mirror 4 has the full-face metallic film 11 coated all over its surface 4a but has no metallic film on the back 4b.

In Embodiment 3 the main reflecting mirror 3 is a concave mirror serving as a first reflecting mirror, and the sub reflecting mirror 4 is a convex mirror serving as a second reflecting mirror. Accordingly, the optical system of the multi-frequency telescope of this embodiment is also a Cassegrain optical system.

Since this embodiment is identical in construction with Embodiment 1 except that the sub reflecting mirror 4 has the full-face metallic film 11 coated all over its surface 4a but has no metallic film on the back 4b, a description will be given below of only differences in operation resulting from the structural difference.

The radio waves 1 from celestial objects are reflected by the grid-like metallic film 10 coated all over the surface 3a of the main reflector 3, then reflected again by the full-face metallic film 11 coated all over the surface 4a of the sub reflecting mirror 4, and the thus reflected radio waves pass through the opening 5 of the main reflecting mirror 3 for convergence to the focal point 6 behind it.

On the other hand, the infrared and visible rays 2 from the celestial objects pass through the grid-like metallic film 10 coated all over the surface 3a of the main reflecting mirror 3, then they are reflected by the full-face metallic film 11 deposited all over the back 3b of the main reflecting mirror 3 and reflected again by the full-face metallic film 11 deposited all over the surface 4a of the sub reflecting mirror 4 to pass through the opening 5 of the main reflecting mirror 3 for convergence to the focal point 7 in the rear thereof.

As described above, according to this embodiment, since only the surface 3a of the main reflecting mirror 3 is coated with the grid-like metallic film 10 as depicted in FIG. 4, it is possible to provide the same results obtainable with Embodiment 2, using a smaller number of metallic films.

Embodiment 4

Figure 5:
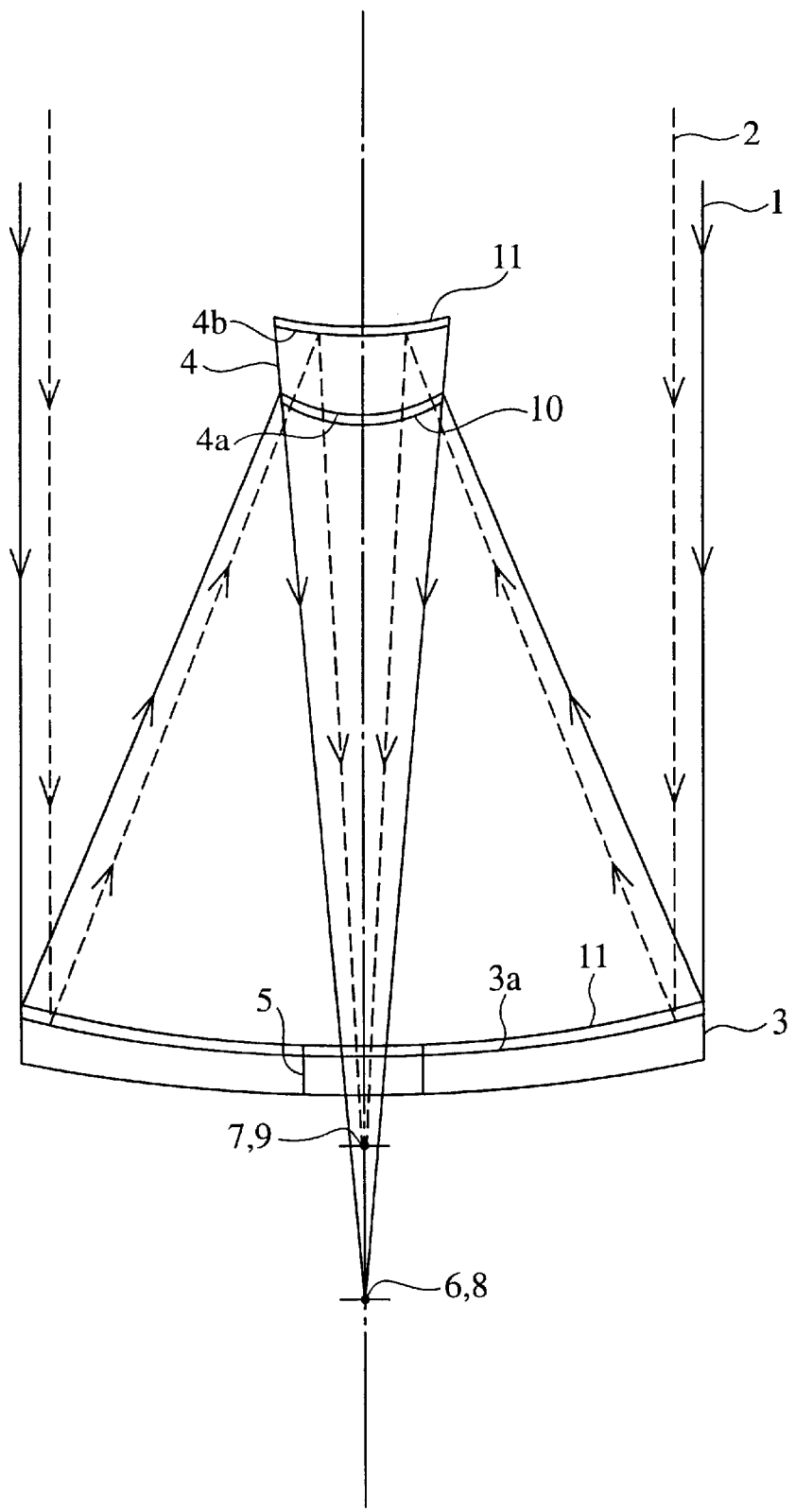
FIG. 5 is a sectional view of the optical system of a multi-frequency telescope apparatus according to a fourth embodiment of the invention.

FIG. 5 is a schematic showing of the optical system of a multi-frequency telescope apparatus for celestial observations using a reflecting telescope according to a forth embodiment (Embodiment 4) of the present invention. In FIG. 5, the same parts as those in FIG. 2 are designated by similar reference numerals, and hence their description will not be repeated. In FIG. 5 the main reflecting mirror 3 has its surface 3a coated with the full-face metallic film 11 but has no metallic film on the back 3b.

In this embodiment the main reflecting mirror 3 is a concave mirror serving as the second reflecting mirror, and the sub reflecting mirror is a convex mirror serving as the first reflecting mirror. Accordingly, the optical system of the multi-frequency telescope apparatus of this embodiment is also the Cassegrain optical system.

Since this embodiment is identical in construction with Embodiment 1 except that the main reflecting mirror 3 has the full-face metallic film 11 coated all over its surface 3a but has no metallic film on the back 3b, a description will be given below of only differences in operation resulting from the structural difference.

The radio waves 1 from celestial objects are reflected by the full-face metallic film 11 coated all over the surface 3a of the main reflector 3, then reflected again by the grid-like metallic film 10 coated all over the surface 4a of the sub reflecting mirror 4, and the thus reflected radio waves pass through the opening 5 of the main reflecting mirror 3 for convergence to the focal point 6 behind it.

On the other hand, the infrared and visible rays 2 from the celestial objects are reflected by the full-face metallic film 11 coated all over the surface 3a of the main reflecting mirror 3, then pass through the grid-like metallic film 10 coated all over the surface 4a of the sub reflecting mirror 4, then the rays are reflected by the full-face metallic film 11 deposited all over the back 4b of the sub reflecting mirror 4 to pass through the opening 5 of the main reflecting mirror 3 for convergence to the focal point 7 in the rear thereof.

As described above, according to this embodiment, too, since only the surface 4a of the sub reflecting mirror 4 is coated with the grid-like metallic film 10 as depicted in FIG. 5, it is possible to provide the same results obtainable with Embodiment 2, using a smaller number of metallic films.

Embodiment 5

Figure 6:
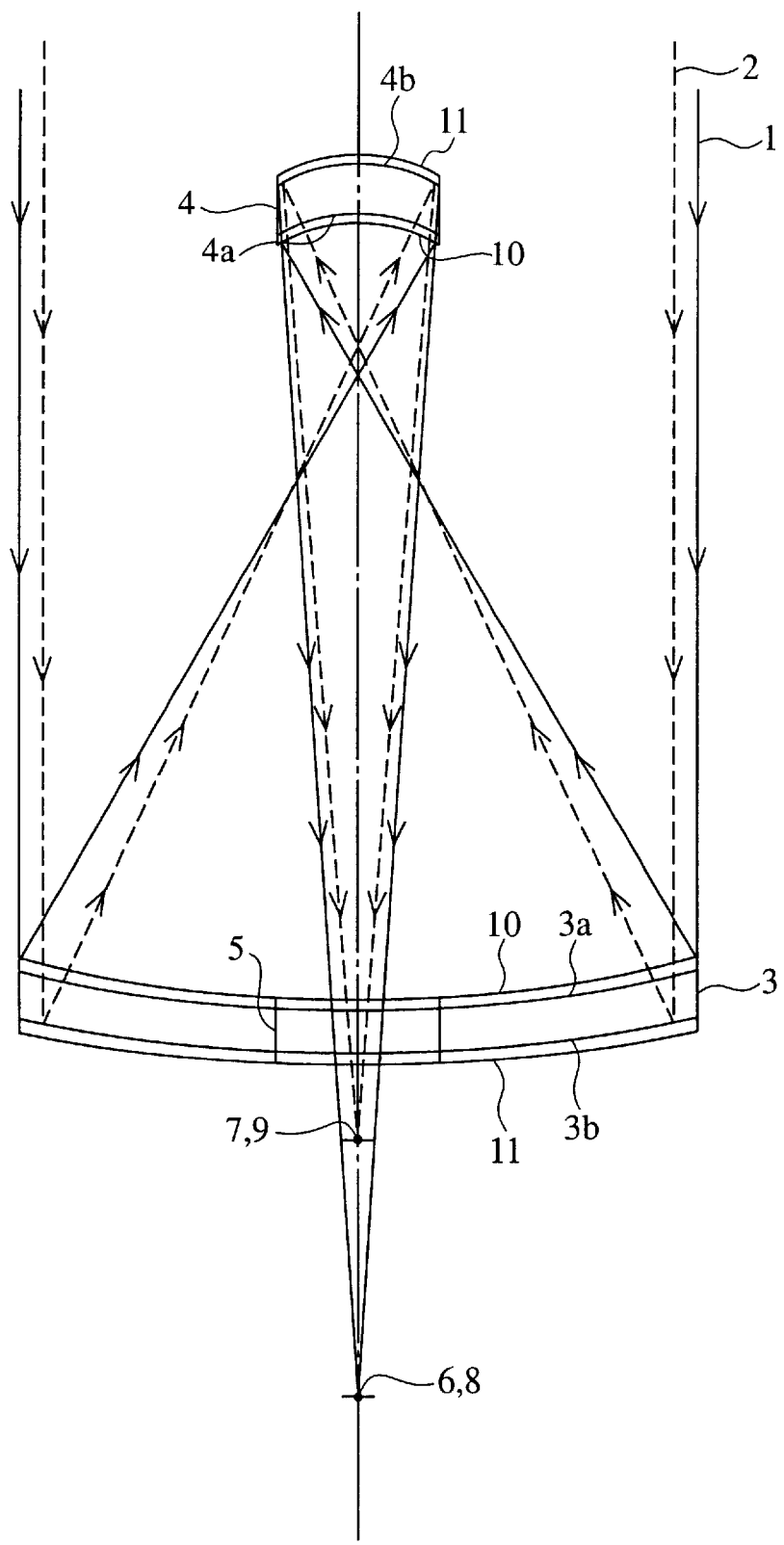
FIG. 6 is a sectional view of the optical system of a multi-frequency telescope apparatus according to a fifth embodiment of the invention.

FIG. 6 is a schematic showing of the optical system of a multi-frequency telescope apparatus for celestial observations using a reflecting telescope according to a fifth embodiment (Embodiment 5) of the present invention. In FIG. 6, the same parts as those in FIG. 2 are designated by similar reference numerals, and hence their description will not be repeated. In FIG. 5 the sub reflecting mirror 4 is a concave mirror.

In this embodiment the main reflecting mirror 3 is a concave mirror serving as the second reflecting mirror, and the sub reflecting mirror is a convex mirror serving as the first reflecting mirror. Accordingly, the optical system of the multi-frequency telescope apparatus of this embodiment is a Gregorian optical system.

Since this embodiment is identical in construction with Embodiment 1 except that sub main reflecting mirror 4 is a concave mirror, a description will be given below of only differences in operation resulting from the structural difference.

The radio waves 1 from celestial objects are reflected by the grid-like metallic film 10 coated all over the surface 3a of the main reflector 3, then reflected again by the grid-like metallic film 10 coated all over the surface 4a of the sub reflecting mirror 4, and the reflected radio waves pass through the opening 5 of the main reflecting mirror 3 for convergence to the focal point 6 behind it.

On the other hand, the infrared and visible rays 2 from the celestial objects pass through the grid-like metallic film 10 coated all over the surface 3a of the main reflecting mirror 3, then they are reflected by the full-face metallic film 11 coated all over the surface 3a of the main reflecting mirror 3, then the thus reflected rays pass through the grid-like metallic film 10 deposited all over the back 4a of the sub reflecting mirror 4 and are again reflected by the full-face metallic film 11 coated all over the back 4b of the sub reflecting film 4 to pass through the opening 5 of the main reflecting mirror 3 for convergence to the focal point 7 in the rear thereof.

As described above, according to this embodiment, it is possible to provide the same results obtainable with Embodiment 2 also when the Gregorian optical system is used in which the main reflecting mirror 3 and the sub reflecting mirror 4 are both concave mirrors.

Embodiment 6

Figure 7:
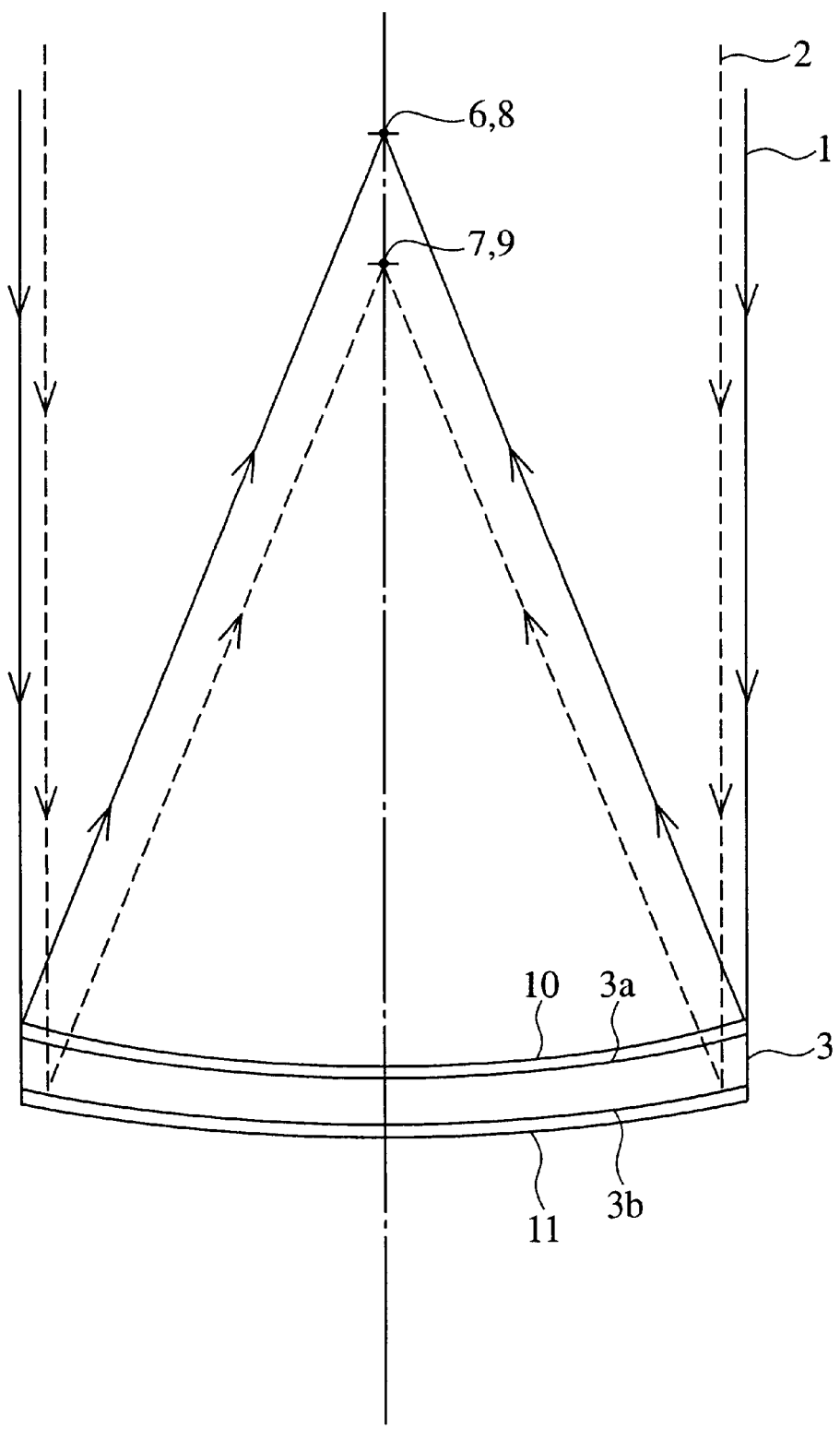
FIG. 7 is a sectional view of the optical system of a multi-frequency telescope apparatus according to a sixth embodiment of the invention.
Figure 8:
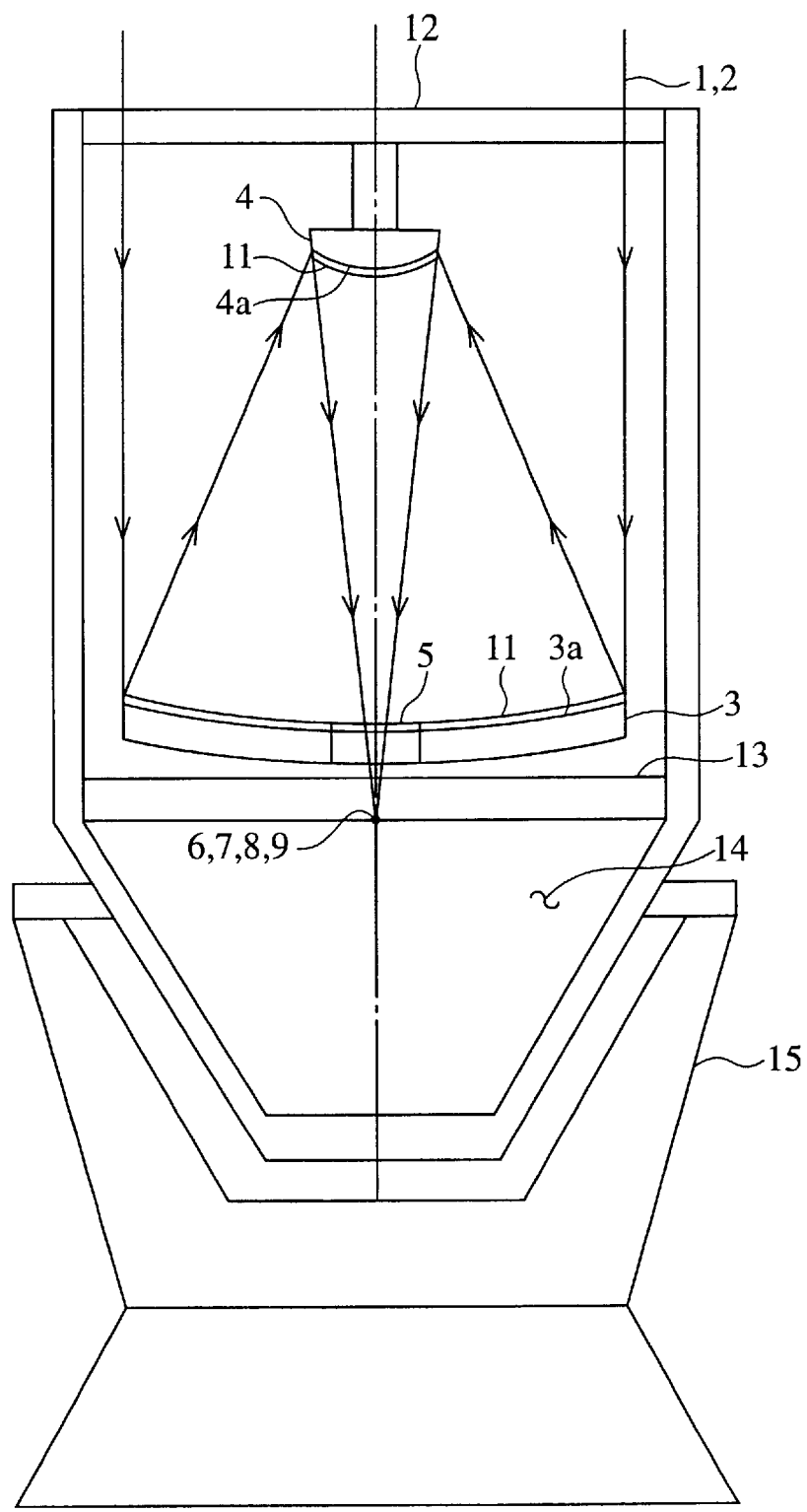
FIG. 8 is a sectional side view of a conventional telescope apparatus for celestial observations using reflecting telescopes.
Figure 9:
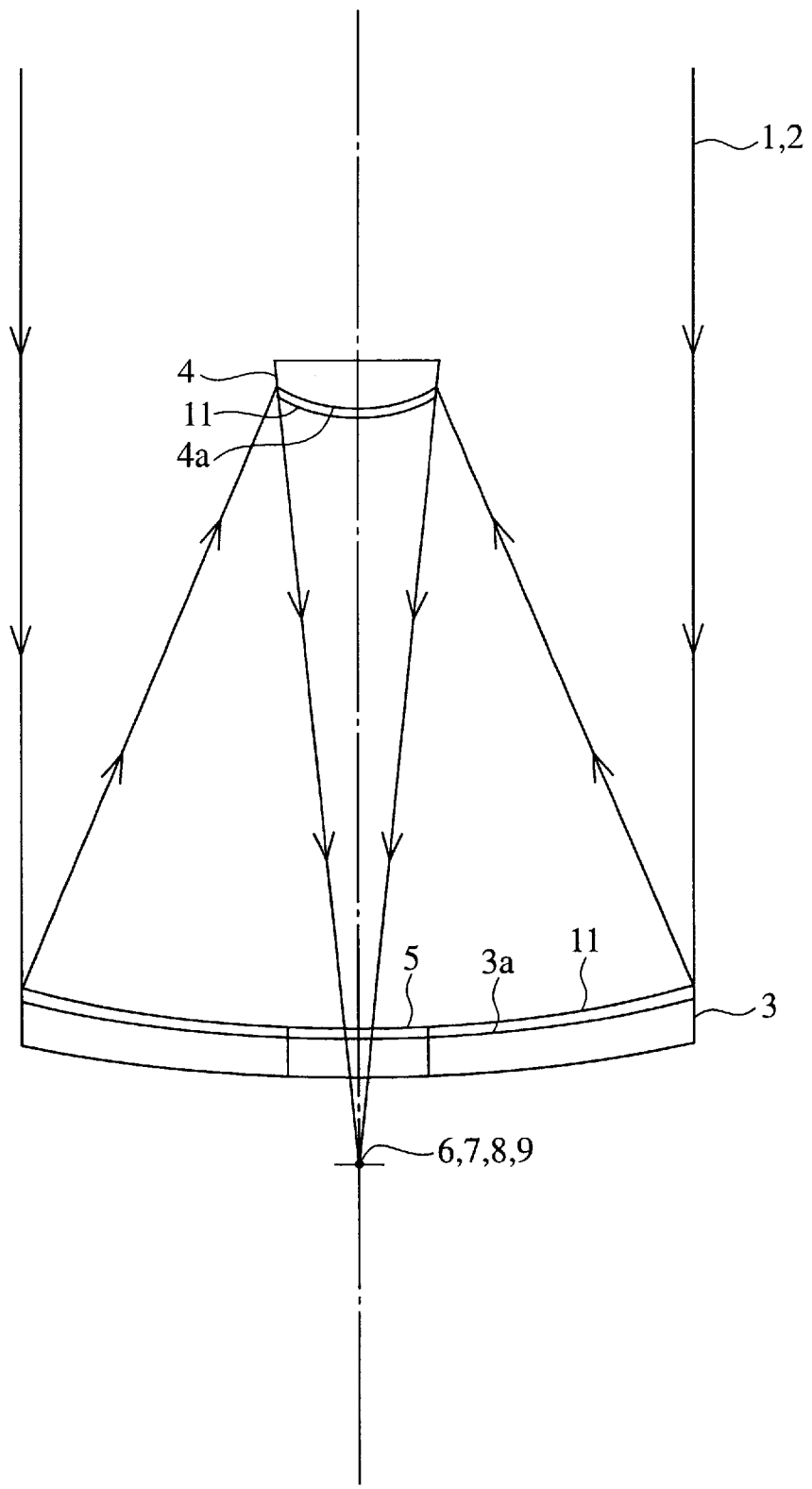
FIG. 9 is a sectional view of the optical system of the conventional telescope apparatus of FIG. 8.

FIG. 7 is a schematic showing of the optical system of a multi-frequency telescope apparatus for celestial observations using a reflecting telescope according to a sixth embodiment (Embodiment 6) of the present invention. In FIG. 7, the same parts as those in FIG. 2 are designated by similar reference numerals, and hence their description will not be repeated.

In this embodiment the main reflecting mirror is a concave mirror serving as the first reflecting mirror and no sub reflecting mirror is used. Accordingly, the optical system of the multi-frequency telescope apparatus of this embodiment is a prime focus optical system.

Since this embodiment is identical in construction with Embodiment 1 except that sub main reflecting mirror 4 is a concave mirror, a description will be given below of only differences in operation resulting from the structural difference.

The radio waves 1 from celestial objects are reflected by the grid-like metallic film 10 coated all over the surface 3a of the main reflector 3 for convergence to the focal point 6 in front thereof.

On the other hand, the infrared and visible rays 2 from the celestial objects pass through the grid-like metallic film 10 coated all over the surface 3a of the main reflecting mirror 3, then they are reflected by the full-face metallic film 11 coated all over the back 3b of the main reflecting mirror 3 for convergence to the focal point 7 in front thereof.

As described above, according to this embodiment, it is possible to provide the same results obtainable with Embodiment 2 also when the prime focus optical system is used which uses only the main reflecting mirror 3.

EFFECT OF THE INVENTION

As described above, according to a first aspect of the present invention, since the focal point of the radio waves and the focal point of the infrared and visible rays are set at different positions, it is possible to provide, around the focal points, spaces available for placement and simultaneous operation of the primary radiator for a receiver or beam transmission system and the light receiving element of optical system. This permits simultaneous celestial observations at the respective frequencies of the radio waves and the infrared and visible rays.

According to a second aspect of the present invention, only the surface of the first reflecting mirror is coated with the grid-like metallic film. In this instance, too, celestial observations can be made simultaneously at the frequencies of the radio waves and the infrared and visible rays.

According to another aspect of the present invention, the use of the Gregorian optical system, in place of the Cassegrain optical system, also enables celestial observations to be made simultaneously at the frequencies of the radio waves and the infrared and visible rays.

According to another aspect of the present invention, the use of the prime focus optical system, in place of the Cassegrain optical system, also permits celestial observations simultaneously at the frequencies of the radio waves and the infrared and visible rays.

According to another aspect of the present invention, since the focal points are displaced from the optical axis of the main reflecting mirror, it is possible to provide space available for placement and simultaneous operation of both the primary radiator for a receiver or beam transmission system and the light receiving element or optical system.

According to still another aspect of the present invention, since the focal points of two incident waves of different frequencies, other than the radio waves and the infrared and visible rays, are set at different positions, it is possible to provide, around the two focal points, space available for placement and simultaneous operation of devices for feeding the incident waves to a receiver or observation apparatus. Hence, celestial observations can be conducted simultaneously at the respective frequencies of the incident waves.

What is claimed is:

1. A multi-frequency telescope apparatus for celestial observations by a reflecting telescope, comprising:

a first reflecting mirror coated over the entire area of its surface with a grid-like metallic film that reflects radio waves but permits the passage therethrough of infrared and invisible rays and coated over the entire area of its back with a full-face metallic film that reflects the radio waves and said infrared and visible rays.

2. The apparatus according to claim 1, further comprising:

a second reflecting mirror coated over the entire area of its surface with a grid-like metallic film that reflects said radio waves but permits the passage therethrough of said infrared and invisible rays and coated over the entire area of its back with a full-face metallic film that reflects said radio waves and said infrared and visible rays.

3. The apparatus according to claim 1, further comprising:

a second reflecting mirror coated over the entire area of its surface with a full-face metallic film that reflects both said radio waves and said infrared and visible rays.

4. The apparatus according to claim 2, whose optical system is a Cassegrain optical system in which said first reflecting mirror is a concave mirror and said second reflecting mirror is a convex mirror.

5. The apparatus according to claim 3, whose optical system is a Cassegrain optical system in which said first reflecting mirror is a concave mirror and said second reflecting mirror is a convex mirror.

6. The apparatus according to claim 3, whose optical system is a Cassegrain optical system in which said first reflecting mirror is a convex mirror and said second reflecting mirror is a concave mirror.

7. The apparatus according to claim 2 whose optical system is a Gregorian optical system in which said first and second reflecting mirrors are both concave mirrors.

8. The apparatus according to claim 1, whose optical system is a prime focus optical system using said first reflecting mirror alone.

9. The apparatus according to claim 4, further comprising:

a plane mirror placed short of the focal point of said radio waves on the optical axis of said first reflecting mirror; and a plane mirror placed short of the focal point of said infrared and visible rays on the optical axis of said first reflecting mirror.

10. The apparatus according to claim 5, further comprising:

a plane mirror placed short of the focal point of said radio waves on the optical axis of said first reflecting mirror; and a plane mirror placed short of the focal point of said infrared and visible rays on the optical axis of said first reflecting mirror.

11. The apparatus according to claim 6, further comprising:

a plane mirror placed short of the focal point of said radio waves on the optical axis of said first reflecting mirror; and a plane mirror placed short of the focal point of said infrared and visible rays on the optical axis of said first reflecting mirror.

12. The apparatus according to claim 7, further comprising:

a plane mirror placed short of the focal point of said radio waves on the optical axis of said first reflecting mirror; and a plane mirror placed short of the focal point of said infrared and visible rays on the optical axis of said first reflecting mirror.

13. The apparatus according to claim 8, further comprising:

a plane mirror placed short of the focal point of said radio waves on the optical axis of said first reflecting mirror; and a plane mirror placed short of the focal point of said infrared and visible rays on the optical axis of said first reflecting mirror.

14. The apparatus according to claim 4, further comprising:

receivers, cameras and other observation devices disposed at the focal points of said radio waves and said infrared and visible rays displaced from the optical axis of said main reflecting mirror.

15. The apparatus according to claim 5, further comprising:

receivers, cameras and other observation devices disposed at the focal points of said radio waves and said infrared and visible rays displaced from the optical axis of said main reflecting mirror.

16. The apparatus according to claim 6, further comprising:

receivers, cameras and other observation devices disposed at the focal points of said radio waves and said infrared and visible rays displaced from the optical axis of said main reflecting mirror.

17. The apparatus according to claim 7, further comprising:

receivers, cameras and other observation devices disposed at the focal points of said radio waves and said infrared and visible rays displaced from the optical axis of said main reflecting mirror.

18. The apparatus according to claim 8, further comprising:

receivers, cameras and other observation devices disposed at the focal points of said radio waves and said infrared and visible rays displaced from the optical axis of said main reflecting mirror.

19. The apparatus according to claim 9, further comprising:

receivers, cameras and other observation devices disposed at the focal points of said radio waves and said infrared and visible rays displaced from the optical axis of said main reflecting mirror.

20. The apparatus according to claim 1, which is not limited specifically to said radio waves and said infrared and visible rays and is capable of simultaneous observations of two incident waves of different frequencies.

* * * * *